Dec. 5, 1950  W. A. SCHWALM  2,533,146
INTELLIGENCE TRANSMISSION SYSTEM
Filed Oct. 25, 1945
Fig. 1
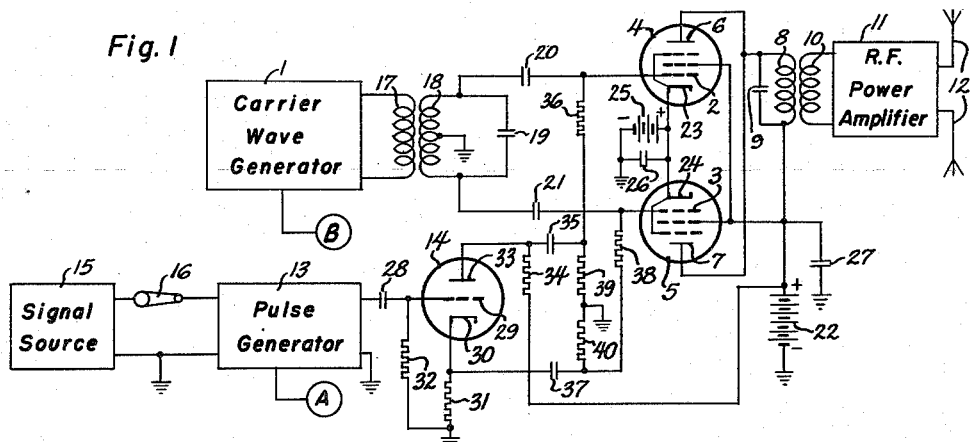

Fig. 5
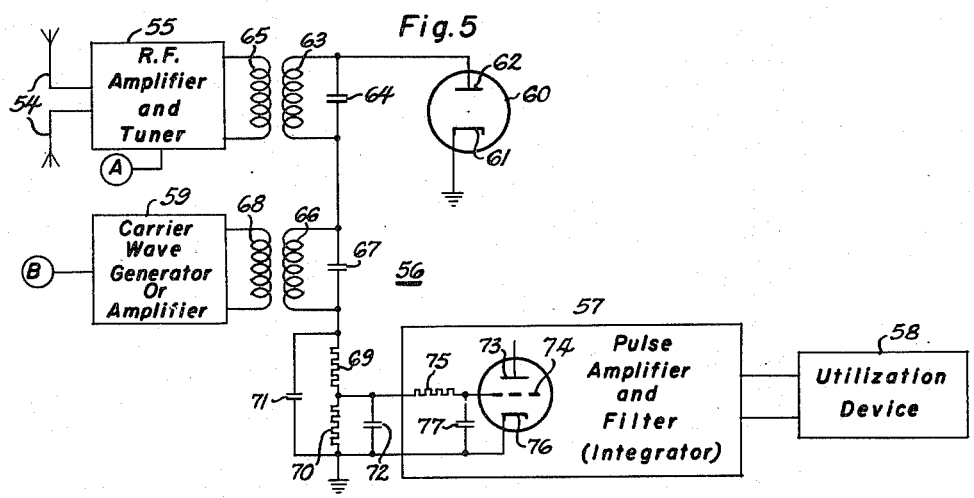
Fig. 6
Fig. 7
WALTER A. SCHWALM
INVENTOR.
BY David M. Davis
Frank L. Mauritz
HIS ATTORNEYS Patented Dec. 5, 1950

2,533,146

UNITED STATES PATENT OFFICE 2,533,146

INTELLIGENCE TRANSMISSION SYSTEM

Walter A. Schwalm, Oak Park, Ill., assignor to Zenith Radio Corporation, a corporation of Illinois Application October 25, 1945, Serial No. 624,355

2 Claims. (Cl. 250—6)

This invention relates to communication systems employing timing modulation, and particularly to such systems in which intermittent pulses of energy are transmitted to a receiver which responds to some characteristic of such pulses imparted either in the transmitter or during the passage of the pulses to the receiver.

Such systems are utilized to a great extent for the measurement of the distance and direction of objects toward which the pulses of energy are radiated and from which they are reflected so that the time of travel of the pulses indicate the distance of the object and directionally sensitive antennas indicate the direction of the object.

Such systems have also been utilized in which pulse width or pulse spacing or frequency, or the frequency of the carrier wave forming the pulses has been modulated in accordance with signals which are reproduced by the receiver.

For all such uses of such systems, the pulse width must be small enough, and the steepness of the leading and trailing edges of the pulse of energy must be great enough so that the desired intelligence whether it be the distance of an object and its direction, or whether it be a signal to be transmitted from the pulse transmitter may be faithfully reproduced by the receiver. For example, in systems for measuring distance of the order of one mile, the time to be measured between the transmission of a pulse and its subsequent reflection by the object whose distance is to be measured is in the order of 10 microseconds, and a pulse having a duration of the order of 1 microsecond must have an extremely well defined shape at the receiver for accurate determination of distances to be made under such circumstances. Similarly, where audible signals are to be transmitted by modulation of pulse width, and where such audible frequencies lie in a range to 10,000 cycles per second, it is highly desirable that the pulse repetition rate be at least as high as the highest signal frequency and preferably in the order of 100,000 times per second, and that the width of each pulse and correspondingly, the steepness of the leading and trailing edges of each pulse be kept within close limits at the receiver so as to correspond with the transmitted pulses.

Much difficulty in such systems has been occasioned by extraneous voltages, commonly termed "random noise" and "static," which cause the edges of pulses to become badly impaired or undiscernible with a corresponding reduction in the accuracy of distance measurement or correspondingly poor fidelity of signal transmission. In other words, the "signal to noise" ratio of such systems is poor.

It is an object of my invention to provide such a system which is arranged to reduce to a large extent the effect of random noise and static upon the pulses of energy utilized in the systems. Stated in other words, it is a principal object of my invention to produce a large increase in the signal to noise ratio of such a system.

The features of the present invention which are believed to be novel are set forth with particularity in the appended claims. The present invention itself, both as to its organization and manner of operation, together with further objects and advantages thereof may best be understood by reference to the following description taken in connection with accompanying drawings in which:

Figure 1 is a transmitter arranged in accordance with the invention;

Figure 5 is a receiver arranged in accordance with the invention; and

Figures 6 and 7 illustrate certain characteristics of the receiver shown in Figure 5.

Figure 2:
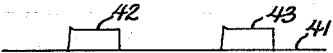
Figures 2, 3 and 4 illustrate certain characteristics of the apparatus shown in Figure 1.

In Figure 1 a carrier wave generator 1 excites the control electrodes 2 and 3 of electron discharge amplifier devices 4 and 5 arranged in push pull relation with respect to their control electrode and the anodes 6 and 7 of these devices 4 and 5 are connected together in parallel to excite a tuned circuit having an inductance 8 connected in parallel with a condenser 9 across which amplified carrier wave potentials appear. The inductance 8 is coupled to a coil 10 into the input of a radio frequency power amplifier 11 which amplifies, and if necessary multiplies the frequency of, the carrier wave from the tuned circuit 8, 9. An antenna 12 is connected to the output of the amplifier 11 so that the amplified carrier waves are radiated into space.

The biases on the control electrodes 2 and 3 of the devices 4 and 5 are so arranged that, in the absence of other excitation, the carrier wave is not amplified by either of the devices 4 or 5. This arrangement is also such that when a signal of a given polarity is impressed on the control grids 2 and 3, one of the devices 4 or 5 will be biased into an operative region and will amplify the carrier wave from generator 1 to impress it across the tuned circuit 8, 9.

To this end, a pulse generator 13 excites an electron discharge amplifier device 14 arranged to produce two separate pulse voltages in push-pull relation, these two voltages being applied respectively to the control electrodes 2 and 3 of the devices 4 and 5 in such a manner that they are alternately rendered conducting for carrier waves from generator 1 during each pulse from the generator 13.

The arrangement illustrated may be used in either of two ways. It may be used for distance measurement when a receiver is provided at a nearby location to measure the time between the beginning of a pulse from generator 13 and the beginning of such a pulse after it is reflected by a distant object. The arrangement may alternatively be used as a signal transmission system by modulation of some characteristic of pulses from generator 13 in accordance with the signals to be transmitted. For that purpose, signal source 15 may be connected through switch 16 to the pulse generator 13 and may in known fashion modulate pulse width, pulse repetition rates, pulse spacing, or the like.

In detail, the output of the generator 1 is impressed across a coil 17 which is coupled with a coil 18 at which the center tap is grounded and with which a condenser 19 is connected in parallel to be resonant with coil 18 at the frequency of the waves from generator 1. One terminal of the tuned circuit 18, 19 is connected to the control electrode 2 through a coupling condenser 20, and the other terminal of the circuit 18, 19 is connected through coupling condenser 21 to control electrode 3, so that those two control electrodes are excited in balanced, or push-pull relation from the tuned circuit 18, 19. As stated previously, the anodes 6 and 7 are connected together and to one terminal of the tuned circuits 8, 9, and the other terminal of that tuned circuit 8, 9, is connected to the positive terminal of a source 22 of operating current, the negative terminal of which is grounded. The cathodes 23 and 24 of the devices 4 and 5 are connected together, and are connected to the positive terminal of a source 25 of biasing potential, the negative terminal of which is grounded. A bypassing condenser 26 is connected in shunt with the source 25 to maintain cathodes 23 and 24 at ground potential for high frequency currents, and the similar by-passing condenser 27 is connected in parallel with the source 22 for a similar purpose.

The source 25 is of sufficiently large potential just to prevent the flow of discharge current in each of the devices 4 or 5 when the control electrodes 2 and 3 are excited only by a carrier wave from the generator 1. These control electrodes 2 and 3 are arranged to be excited additionally by pulses from the generator 13 as follows:

One terminal of the output of pulse generator 13 is grounded and the other terminal is connected through a coupling condenser 28 to the control electrode 29 of the device 14, whose cathode 30 is connected through a resistance 31 to ground and whose control electrode 29 is connected through a resistance 32 to ground. The anode 33 of device 14 is connected through a resistance 34 to the positive terminal of source 22 and the resistances 31 and 34 are adjusted so that the oppositely phased voltages appearing on the cathode 30 and the anode 33 are substantially equal at every instant no matter how the potential of control electrode 29 may vary.

The anode 33 is connected through a coupling condenser 35 and a resistance 36 connected in series to the control electrode 2 of device 4, and the cathode 30 of device 14 is connected to a coupling condenser 37 and through a resistance 38 connected serially to the control electrode 3 of device 5. A point between the coupling condenser 35 and the resistance 36 is connected through a resistance 39 to ground to provide a path for the flow of continuous current between control electrode 2 and cathode 23 of device 4, and similarly resistance 40 is connected between ground at a point between coupling condenser 37 and resistance 38 to provide a path for the flow of continuous current from control electrode 3 and cathodes 23 and 24.

With such an arrangement, the device 14 tends to increase the potential of control electrode 2 and simultaneously decrease the potential of control electrode 3, or alternatively, to increase the potential of control electrode 3 and decrease the potential of control electrode 2. The voltage of pulses from the generator 13 impressed on device 14 is sufficient upon the increase of potential of either control electrodes 2 or 3 to cause the corresponding device 4 or 5 to become conducting and amplify the carrier wave from the generator 1 either in one phase or in the opposite phase.

The condensers 35 and 37 and the resistances 39 and 40 as well as resistances 36 and 38 are substantially equal so that the effect of the balanced pulse voltage developed by device 14 upon the control electrodes 2 and 3 is substantially equal although opposite in sense.

Either condenser 28 or condensers 35 and 37 are made sufficiently small in comparison with the resistive components of the circuits following them that the pulses from generator 13 are not faithfully reproduced. Such a circuit combination of capacity and resistance is commonly termed a "differentiating" circuit.

Figure 3:
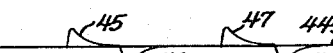

Referring to Figures 2 and 3, the operation of this type of circuit may be better understood. In Figure 2, the base line 41 represents that condition when no voltage is impressed on control electrode 29 of device 14, and the rectangles 42 and 43 represent voltage pulses from generator 13, the abscissae of the figure representing time and the ordinate representing voltage. Pulses 42 and 43 have various leading and trailing edges and are substantially flat on top. The width of the pulses 42 and 43, or the spacing between them or their repetition rate may be adjusted as desired, or when switch 16 is closed, any of such characteristics of those pulses may be modulated by a signal from source 15.

In Figure 3, space line 44 represents that condition when no voltage is impressed on the control electrode 29 of device 14, the abscissae representing time and the ordinate representing voltage across one or the other of resistances 39 or 40. The first illustrated pulse 45 is initially very steep, following the steep leading edge of pulse 42, and immediately after the steep leading edge of pulse 42 is passed, the longer trailing edge of pulse 45 appears and approaches the base line or zero voltage axis 44 at the time when the trailing edge of pulse 42 appears. In response to the trailing edge of pulse 42, a second pulse 46 whose polarity is opposite to that of pulse 45 appears, and after the trailing edge of pulse 42 has disappeared the sloping trailing edge of pulse 46 approaches the line 44 of zero voltage.

In similar fashion, the pulse 43 produces the two oppositely poled pulses 47 and 48.

This operation which produces the pulses 45 and 46 from pulse 42 and the pulses 47 and 48 from the pulse 43 is typical of a "differentiating"

circuit, such as that provided by the condenser 28 and the resistive components of the circuit following it, or by the condensers 35 and 37 and the resistive components of the circuits following them, or by a combination of all of those elements.

Such a "differentiating" is simply one in which the coupling capacity is not sufficiently large to reproduce accurately the pulses 42 and 43, the coupling capacitor being so small that it tends to change its charge substantially in a time shorter than the time length of pulses 42 and 43. Viewed in another manner, such a "differentiating" circuit is one which is capable of transmitting high frequency components of the pulses 42 and 43, more than the low frequency components including their fundamental frequency. In other words, these circuits connected with the device 14 are so arranged that the high frequency components of the pulses utilized in the system as a whole are very greatly exaggerated over the low frequency components of those pulses. The energy of interfering noise is greater at high frequencies than at low frequencies, and this exaltation of the high frequency components of the pulses by means of which intelligence is transmitted to the system is effective to increase the signal to noise ratio of these pulses in the transmitter.

The pulses illustrated in Figure 3, which appear on one of the resistances 39 or 40 also appear in inverted phase on the other of these resistances, with the consequence that, for example, the pulse 45 increases the potential of control electrode 2 of device 4 to cause device 4 to become conductive while the potential of control electrode 3 of device 5 is made more negative so that device 5 remains non-conductive and a carrier wave is transferred from generator 1 to the tuned circuit 8, 9. The succeeding pulse 46 of opposite polarity increases the potential of control electrode 2 and causes device 4 to become non-conductive while the potential of control electrode 3 of device 5 is made less negative sufficiently to make device 5 conducting and carrier waves are then transferred from the generator 1 through device 5 to the circuit 8, 9 in phase opposite to that when device 4 was conducting.

Figure 4:
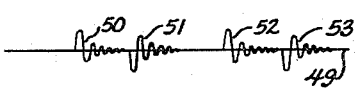

In Figure 4 space line 49 represents carrier wave voltage across the tuned circuit, 8, 9, the abscissae representing time and the ordinate representing carrier wave voltage. The oscillations 50 have an envelope corresponding to the pulse 45, and the succeeding oscillations 51 have an envelope corresponding to the pulse 46, the oscillations 51 being of opposite phase to the oscillations 50. Similarly, the oscillations 52 have an envelope corresponding to the pulse 47 and the oscillations 53 have an envelope corresponding to the pulse 48, the oscillations 53 having a phase opposite to the oscillations 52.

These succeeding bursts 50, 51, 52 and 53 of oscillation at carrier wave frequency which appear across the tuned circuit 8, 9, are amplified through the amplifier 11 and radiated from the antenna 12.

In Figure 5, a receiver suitable for the reception of signals radiated by the transmitter of Figure 1 includes an antenna 54, a radio frequency amplifier and tuner 55, a detector circuit 56, a pulse amplifier and filter 57, and a utilization device 58. The detector circuit 56 simultaneously rectifies signals from the R. F. tuner and amplifier 55 and from a source 59 of carrier waves having the same, or substantially the same, frequency as carrier waves from the generator 1 of Figure 1, specifically, this detector circuit 56 includes a diode rectifier 60 whose cathode 61 is grounded and whose anode 62 is connected to one terminal of a parallel resonant circuit including an inductance 63 and a condenser 64 connected in parallel with the inductance 63. The output of the radio frequency amplifier 55 is impressed across an inductance 65 which is coupled with the inductance 63. The other terminal of the tuned circuit 63, 64 is connected to one terminal of a second parallel resonant circuit including an inductance 66 and a condenser 67 connected in parallel with the inductance 66. The output of the carrier wave generator or amplifier 59 is impressed across an inductance 68 which is coupled with the inductance 66. The other terminal of the tuned circuit 66, 67 is connected through two resistances 69 and 70, arranged serially to ground. A condenser 71 is connected in shunt with the resistances 69 and 70 and the reactance of the condenser 71 is made small at the frequency of carrier waves from the source 59 or from the amplifier and tuner 55, but is made large enough so that it does not substantially alter the wave form of the detected envelope of carrier wave rectified in the diode rectifier 60. A condenser 72 is connected in shunt with resistance 70 and the detected pulse, or envelope, voltage across resistance 70 is amplified and filtered in the pulse amplifier and filter 57 by means of an electron discharge amplifier device 73 whose control electrode 74 is connected through a resistance 75 to the ungrounded terminal of resistance 70 and whose cathode 76 is grounded. A condenser 77 is connected between the control electrode 74 and the cathode 76.

The condenser 72 is sufficiently large that it has a small reactance at the frequency of carrier waves from generator 59 or the amplifier and tuner 55, and the condenser 72, together with the resistance 69 and the other resistance of the detector circuit 56 as well as the condenser 77 and the associated resistance 75, form a part of the filter circuit represented by the rectangle 57. This filter circuit is of the type commonly termed an "integrating circuit," and it is arranged to transmit low frequency components of signals in greater intensity than high frequency components thereof.

In operation, bursts of oscillation at the radio frequency, as represented in Figure 4, are received on the antenna 54 and appear across the tuned circuit 63, 64. Simultaneously, a carrier wave of the same, or substantially the same, frequency is impressed across the tuned circuit 66, 67 from the source 59 and both carrier wave voltages are simultaneously rectified by the diode 60.

As explained previously, the bursts of oscillation represented by Figure 4 are alternately of opposite phase at carrier frequency and therefore alternately reinforce or tend to cancel oscillations of substantially the same frequency from the source 59 impressed across the diode 60. Therefore, the diode 60 in the presence of oscillations from antenna 54 of one phase tends to decrease the potential across the resistance 70 due to the oscillations from the source 59, and in the presence of oscillations from the antenna 54 of the opposite phase tends to increase the potential across the resistance 70 due to the oscillations from the source 59.

In Figure 6, the base line 78 represents a condition of zero voltage across resistance 70, abscissae representing time and ordinate representing voltage of negative polarity developed across resistance 70. The dotted line 79 represents the voltage across resistance 70 produced by rectification of the diode 60 of waves from the source 59 in the absence of any wave received by the antenna 54. The pulse 80, similar in form to the pulse 45 of Figure 3, represents the voltage across the resistance 70 during the presence of a burst of carrier waves received by the antenna 54 corresponding to the oscillations 50 in Figure 4, those received oscillations being substantially in phase with oscillations from the source 59. The succeeding oppositely poled pulse 81 in Figure 6, similar in form to the pulse 46 of Figure 3 correspondingly represents the voltage across the resistance 70 in the presence of a burst of oscillations received by the antenna 54 such as the oscillation 51 in Figure 4, those received oscillations being substantially opposite in phase to oscillations from the source 59.

In a similar fashion, the pulse 82 represents the detected signal across resistance 70 in response to the reception upon antenna 54 of a burst of oscillations such as the bursts 52 in Figure 4, and the shape of the pulse 82 is similar to the pulse 47 in Figure 3. Likewise, the pulse 83 is similar in shape to the pulse 48 in Figure 3 and represents the signal across resistance 70 produced in response to the reception on antenna 54 of the burst 53 of oscillations shown in Figure 4.

The pulses 80, 81, 82 and 83 actually appear across the two serially connected resistances 69 and 70 in Figure 5, and appear in the same form across resistance 70 only if condenser 72 has a very large reactance at the frequency of high frequency components of those pulses. In a practical arrangement, the condenser 72 is made somewhat larger so that the pulses 80, 81, 82, 83 which appear across the combination of resistances 69 and 70 tend to become integrated across resistance 70 and are further integrated in the combination of resistance 75 and condenser 77 so that they reappear in square form.

In Figure 7, the integrated square pulse form of the pulses 80, 81, 82 and 83 is illustrated as two rectangular pulses 84 and 85. The base line 86 represents a condition of voltage between the control electrode 74 and cathode 76 corresponding to the voltage represented by the dotted lines 79 in Figure 6. The leading edge of the square pulse 84 corresponds with the leading edge of the pulse 80 in Figure 6, and the flat top of pulse 84 corresponds to the interval between the peaks of the two succeeding pulses 80 and 81 of Figure 6. The condenser 77 is made sufficiently large with respect to the resistance 75 that its condition of charge does not change substantially in the time interval between the peaks of the pulses 80 and 81 of Figure 6. The trailing edge of the square pulse 84 corresponds approximately with the leading edge of the oppositely poled pulse 81, which removes the charge from condenser 77 which was impressed upon it by the preceding pulse 80.

In a similar fashion, pulse 82 charges up condenser 77 to produce the leading edge and flat top of pulse 85, and pulse 83 discharges condenser 77 to produce the trailing edge of pulse 85. This filter 75, 77, which may also include the resistance 69 and condenser 72, if desired, performs an operation upon the pulses transmitted through the system which is in a sense the reverse of the operation produced by the differentiating circuit of Figure 1. If the filter, or integrating circuit, were not used and the carrier wave were modulated by square pulses like that shown in Figure 7 so as to reproduce such square pulses at the input to the pulse amplifier 57, random noise and external voltages would frequently cause confusion or even obliteration of the received pulses with a corresponding deterioration in the quality of the signal received or a corresponding decrease in the accuracy of the measurement of the distance under consideration. Because most of the energy of random noise and external voltages is in the high frequency medium, and because the filter or integrating circuit 75, 77 may be regarded as a low pass filter, it has the effect of attenuating to a very great degree any such random noise or external voltages. Therefore the receiver of Figure 5 has a very large signal to noise ratio by reason of the use of such integrating circuit for the reproduction of pulses as described.

If the pulses which modulate the carrier wave in the transmitter of Figure 1 are modulated in accordance with signals from the source 15 of Figure 1, as by modulation of the width, spacing or repetition rate or the like of such pulses, those pulses, as illustrated in Figure 7, which are reproduced in the pulse amplifier and filter 57 are utilized in the utilization device 58 to operate appropriate means for reproducing the signal from the modulation of the pulse width, spacing, repetition rate, or the like, as the case may be so that the signal itself may be reproduced and utilized as desired.

If the transmitter of Figure 1 and the receiver of Figure 5 are to be utilized as a distance measuring arrangement, the signal source 15 need not be utilized and the switch 16 may be left open, if desired. In the usual case, the transmitter of Figure 1 and the receiver of Figure 5 are relatively close together and, in order to prevent complete paralysis of the receiver of Figure 5 during the time when the receiver should be in operation to receive a reflected burst of energy from distant objects, an arrangement is used in the radio frequency amplifier and tuner 55 to disable or block the receiver input during the time when the transmitter is transmitting a pulse or burst of energy from the antenna 12. For this purpose a connection A is indicated between the pulse generator 13 of Figure 1 and the radio frequency amplifier and tuner 55 of Figure 5. Generation of a pulse by the generator 13 is effective to disable or block the receiving discharge devices in the radio frequency amplifier 55, so that the tuned circuits connected therewith are not subject to shock excitation so powerful that they are not subsequently sensitive to the weak reflected energy received from a distant object.

Further, when the transmitter of Figure 1 and receiver of Figure 5 are relatively close together as for the purpose of distance measurement, the carrier wave impressed by the source 59 on the diode 60 may be made precisely the same in phase and frequency as the carrier wave from the generator 1 by a suitable connection B indicated in Figures 1 and 5 between the generator 1 and the source 59. In such case, the source 59 is only a carrier amplifier and need not be specially tuned so that the frequency of the output wave from it is the same or substantially the same as the frequency of the wave from the generator 1.

It is within the scope of my invention also to supply the carrier wave, which is illustrated in Figure 5 as supplied by the source 59, by radiation directly from the transmitter of Figure 1. In such case, the source 59 in the receiver of Figure 5 may be entirely dispensed with and the carrier wave from generator 1 may be radiated continuously from the antenna 12 in addition to the pulse bursts of oscillation 50, 51, 52, 53, etc. In such case it is preferred that the intensity of this continuously radiated carrier wave should be substantially equal to the peak intensity of the oscillations which form the bursts 50, 51, 52, 53, etc. With such operation of the system, the envelope of the carrier wave appears to be modulated by the pulses of Figure 3, and if desired, the carrier wave may be "pulse modulated" in the well known manner by the pulses of Figure 3, the operation of the differentiating and integrating circuits respectively in the transmitter and receiver being the same.

It is also within the scope of my invention to utilize pulses of sawtooth form in which the leading or trailing edge is steep and the other edge much less steep. Certain advantages of the invention are retained when such pulses are "differentiated" in the transmitter before modulation of the carrier, and are "integrated" in the receiver. That is, such pulses may be, before the modulation of the carrier wave in the transmitter, passed through a high frequency pass filter to exaggerate the high frequency components. In the receiver the detected pulses are passed through a low frequency pass filter which reshapes the pulses to provide them with a definite shape and at the same time reduce the random or noise voltage with respect to the pulse.

It should be noted also that a sawtooth pulse is similar in shape to the pulses 45, 46, 47, 48 of Figure 3 and may be regarded as already "differentiated" as a result a sawtooth pulse need not necessarily be transmitted through a high frequency pass filter before modulation of the carrier.

While particular embodiments of the present invention have been shown and described, it will be obvious to those skilled in the art that changes and modifications may be made without departing from this invention in its broader aspects, and therefore, the aim in the appended claims is to cover all such changes and modifications as fall within the true spirit and scope of this invention.

I claim:

1. Apparatus for the transmission of pulses, each of said pulses having a rising portion and a falling portion and consisting of energy systematically distributed over a range from low to high frequencies, said apparatus including a pulse generating portion, a pulse distorting portion connected to said generating portion and a pulse transmitting portion responsive to pulses emitting from said pulse distorting portion, said pulse distorting portion including a pulse differentiating circuit whereby a secondary pulse having a positive direction is formed corresponding to the rising portion of each original pulse, and a secondary pulse having a negative direction is formed corresponding to the falling portion of each of said original pulses, said pulse transmitting portion including a carrier wave generator and a carrier wave amplifier connected to said generator, said amplifier being inoperative in the absence of said secondary pulses and being responsive to a secondary pulse of positive direction to produce amplified oscillations of a first phase and responsive to a secondary pulse of a negative direction to produce amplified oscillations of an opposite phase.

2. A system for communication by pulses, each of said pulses having a rising portion and a falling portion and consisting of electrical energy systematically distributed over a range from low to high frequencies, said system including transmitting apparatus and receiving apparatus, said transmitting apparatus including a pulse generating portion, a pulse distorting portion connected to said generating portion and a pulse transmitting portion responsive to pulses from said pulse distorting portion, said pulse distorting portion including a pulse differentiating circuit whereby a secondary pulse having a positive direction is formed corresponding to the rising portion of each original pulse, and a secondary pulse having a negative direction is formed corresponding to the falling portion of each original pulse, said pulse transmitting portion including a carrier wave generator and a carrier wave amplifier connected to said generator, said amplifier being inoperative in the absence of said secondary pulses and being responsive to a secondary pulse of positive direction to produce amplified oscillations of a first phase and responsive to secondary pulses of negative direction to produce amplified oscillations of an opposite phase, said receiving apparatus including integrating circuits constructed to compensate the high frequency energy accentuation produced in the formation of said secondary pulses from said original pulses.

WALTER A. SCHWALM.

REFERENCES CITED

The following references are of record in the file of this patent:

UNITED STATES PATENTS

| Number | Name | Date |
|---|---|---|
| 1,922,282 | Bellescize | Aug. 15, 1933 |
| 1,969,328 | Roosenstein | Aug. 7, 1934 |
| 2,019,341 | Dome | Oct. 29, 1935 |
| 2,236,364 | Case | Mar. 25, 1941 |
| 2,266,668 | Tubbs | Dec. 16, 1941 |
| 2,361,602 | Clark | Oct. 31, 1944 |
| 2,407,199 | Wolff | Sept. 3, 1946 |
| 2,407,273 | Hart | Sept. 10, 1946 |